(12) United States Patent
Romanek

(10) Patent No.: US 6,450,192 B1
(45) Date of Patent: Sep. 17, 2002

(54) DEVICE FOR VENTILATING A MOTOR VEHICLE FUEL TANK

(75) Inventor: Christian Romanek, Noailles (FR)

(73) Assignee: Compagnie de Materiel et d'Equipements Techniques C.O.M.E.T., Senlis (FR)

( * ) Notice: Subject to any disclaimer, the term of this patent is extended or adjusted under 35 U.S.C. 154(b) by 0 days.

(21) Appl. No.: 09/701,148

(22) PCT Filed: May 7, 1999

(86) PCT No.: PCT/FR99/01089
§ 371 (c)(1),
(2), (4) Date: Nov. 27, 2000

(87) PCT Pub. No.: WO99/61275
PCT Pub. Date: Dec. 2, 1999

(30) Foreign Application Priority Data

May 28, 1998 (FR) .............................................. 98 06727

(51) Int. Cl.[7] .............................................. F16K 24/04
(52) U.S. Cl. ......................................... 137/202; 137/43
(58) Field of Search .................................... 137/43, 202

(56) References Cited

U.S. PATENT DOCUMENTS

| | | | |
|---|---|---|---|
| 4,655,238 A | * 4/1987 | Szlaga | ......................... 137/43 |
| 5,044,389 A | * 9/1991 | Gimby | ................... 137/202 X |
| 5,522,417 A | 6/1996 | Tomioka et al. | |
| 5,535,772 A | * 7/1996 | Roetker et al. | ......... 137/202 X |
| 5,577,526 A | * 11/1996 | Kasugai et al. | ............. 137/202 |
| 5,582,198 A | * 12/1996 | Nagino et al. | |
| 5,640,989 A | * 6/1997 | Nemoto et al. | |
| 5,694,968 A | 12/1997 | Devall et al. | |
| 5,782,258 A | * 7/1998 | Herbon et al. | .......... 137/202 X |
| 5,836,341 A | * 11/1998 | Ayers et al. | ................. 137/202 |
| 5,944,044 A | * 8/1999 | King et al. | .................. 137/202 |
| 5,971,002 A | * 10/1999 | Turpin et al. | ........... 137/202 X |

* cited by examiner

*Primary Examiner*—Gerald A. Michalsky
(74) *Attorney, Agent, or Firm*—Lowe Hauptman Gilman & Berner, LLP

(57) ABSTRACT

A device for ventilating a motor vehicle fuel tank comprises a chamber (24) communicating with the tank and, through a top outlet (30), with a discharge duct (28). The device further comprises, inside the chamber (24), a float (32) controlling a needle valve (40) for closing the top outlet (30) when the fuel level exceeds a predetermined threshold in the chamber (24). The device also comprises, between the tank and the float (32), flow restricting elements (66,68) for limiting the fuel displacement speed before it comes into contact with the float (32).

20 Claims, 4 Drawing Sheets

DEVICE FOR VENTILATING A MOTOR VEHICLE FUEL TANK

The invention relates to a venting system for an automobile vehicle fuel tank.

The invention relates more particularly to a venting system for an automobile vehicle fuel tank, of the type including a chamber which communicates with the tank and, via an outlet orifice at the top, with a vent pipe, which system includes, inside the chamber, a float which controls a needle valve for closing the top outlet orifice if the fuel level in the chamber exceeds a predetermined threshold.

The fuel tank of an automobile vehicle is vented to prevent any positive or negative pressure in the tank which would otherwise risk deforming it greatly.

Accordingly, as the tank is emptied of fuel, it is necessary to admit air into the tank to prevent the pressure therein falling unduly. In contrast, if the tank is exposed to a high temperature rise, for example if the vehicle is parked in direct sunlight, the pressure of the vapor contained in the tank can increase greatly and it is then necessary to evacuate some of the vapor to the outside.

It is also necessary to prevent fuel escaping from the venting system if the level of fuel near the system increases significantly, for example due to acceleration of the vehicle.

To this end, the document EP-A-0 254 631 has already proposed a venting system including a float which is adapted to urge a needle valve upward if the fuel level reaches the system, the needle then closing the exit orifice of the valve to prevent fuel leaking.

However, it has become apparent that a system of the above kind has shortcomings. When the vehicle is moving, the fuel sloshes around and can splash onto the system. Either such splashing can cause unnecessary closure of the top orifice, which can prevent correct venting of the tank, or the splashing avoids the float and reaches the outlet orifice before it is closed, with the risk that it may escape to the outside.

An object of the invention is therefore to propose an improved system which avoids these drawbacks.

To this end, the invention proposes a venting system for an automobile vehicle fuel tank, of the type including a chamber which communicates with the tank and, via an outlet orifice at the top, with a vent pipe, which system includes, inside the chamber, a float which controls a needle valve for closing the top outlet orifice if the fuel level in the chamber exceeds a predetermined threshold, characterized in that the system includes means between the tank and the float for limiting the speed of the fuel before it comes into contact with the float.

According to other features of the invention:

the means for limiting the speed of the fuel include a filter member;

the means for limiting the speed of the fuel include an apertured plate;

the means for limiting the speed of the fuel include chicanes;

the chamber is delimited at the bottom by a bottom transverse wall which has a bottom orifice communicating with the tank and the means for limiting the speed of the fuel are under the bottom transverse wall, between it and the tank;

the bottom transverse wall of the chamber takes the form of a part attached to a casing of the system and the attached part includes means for fixing the means for slowing the fuel;

the attached part includes a cylindrical skirt which extends axially downward from a peripheral. edge of the bottom transverse wall and delimits a housing open at the bottom receiving the means for slowing the fuel;

the means for slowing the fuel are retained in the housing by crimping a bottom edge of the skirt which is deformed transversely toward the axis of the skirt.

Other features and advantages of the invention will become apparent on reading the following detailed description, which refers to the accompanying drawings, in which:

FIG. 1 shows a system 10 for venting a fuel tank of an automobile vehicle, a top wall 12 of which is substantially horizontal when the vehicle is in a normal position on horizontal ground.

Figure 1:
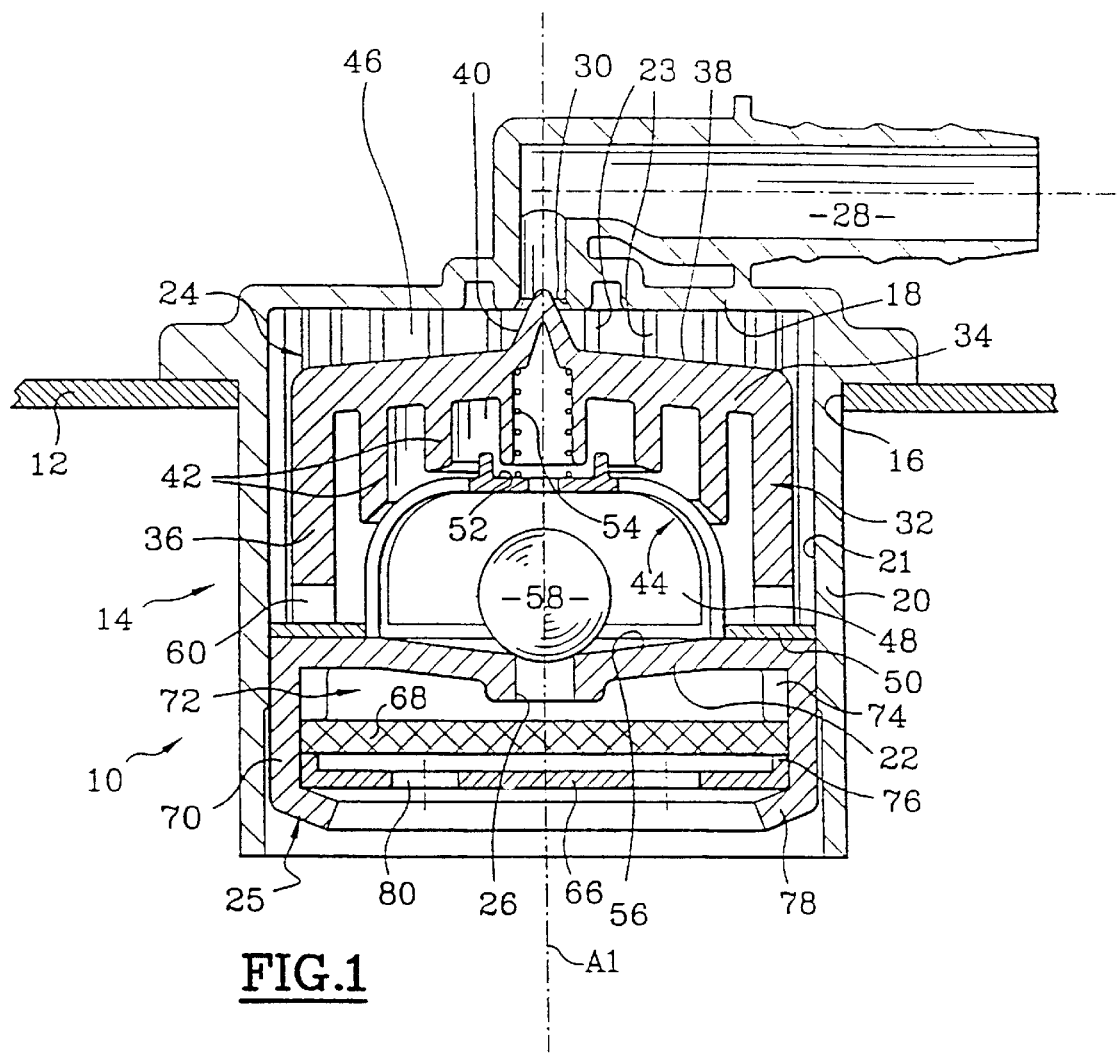
FIG. 1 is a view in axial section of a system conforming to the teachings of the invention when the vehicle is stopped in a normal position.

The system 10 includes a casing 14, part of which is outside the tank and part of which is inside it; the casing 14 therefore extends through an opening 16 in the top wall 12 of the tank. The system 10 is therefore at the top of the tank.

The casing 14 has a top wall 18 from which a cylindrical lateral wall 20 extends downward, along an axis A1 perpendicular to the wall 12 of the tank, through the orifice 16 and into the tank.

The casing 14 also has a bottom transverse wall 22 which in this example takes the form of a component 25 attached to the top and lateral transverse walls 18 and 20, which are molded in one piece. The casing 14 therefore delimits a chamber 24 between the top and bottom transverse walls 18 and 22 which can communicate with the inside of the tank via a bottom orifice 26 at the center of the bottom transverse wall 22 and with a vent pipe 28 via a top orifice 30 in the top transverse wall 18.

In the embodiment shown in the figure the pipe 28 takes the form of a spigot which extends above the casing 14 in a general direction perpendicular to the axis Al, and to which a flexible pipe (not shown) can be connected. The flexible pipe in turn discharges into a cartridge containing active substances capable of fixing fuel vapor, for example.

Figure 3:
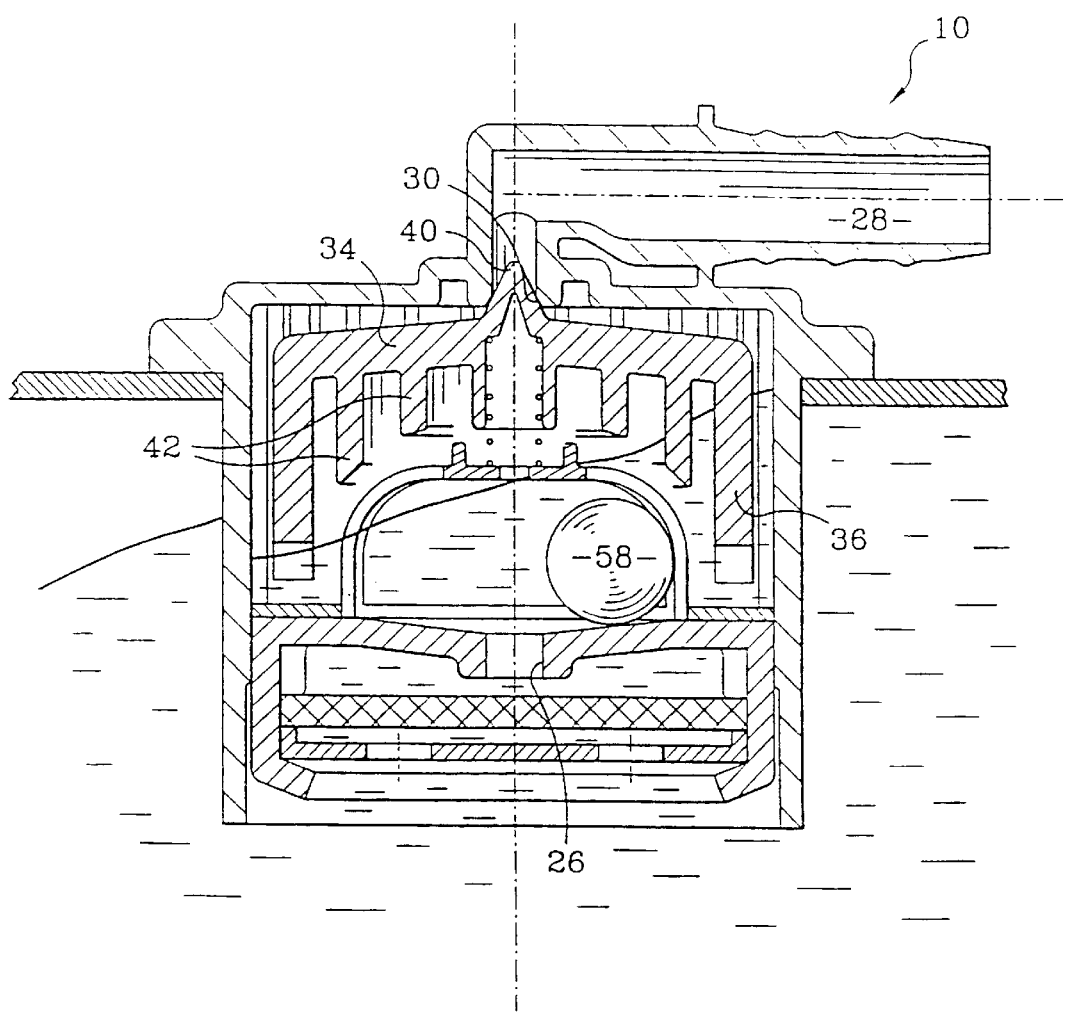
FIG. 3 is a view similar to that of FIG. 1 showing the system when the level of fuel near the system is increasing, for example due to heavy acceleration of the vehicle.

The system 10 includes a first mobile member 32 which is mounted in the chamber 24 to slide in the direction of the axis Al between an open position shown in FIG. 1 and a closed position shown in FIG. 3, for example.

According to one aspect of the invention, the first mobile member is a float. The float 32 essentially includes a top transverse wall 34 from an outside edge of which an external tubular skirt 36 extends axially downward. The float 32 is therefore essentially a tubular body with a substantially vertical axis which is open at the bottom and closed at the top.

The top face 38 of the top wall 34 carries a needle valve 40 which is substantially conical, has an axis A1 and is tapered toward the top. The needle valve 40 is adapted to close the top orifice 30 when the float 32 is in the closed position shown in FIGS. 3 and 4, i.e. when the float 32 is close to the top transverse wall 18 of the casing 14.

The float 32 further includes two tubular cylindrical flanges 42 with axis A1 extending downward from the bottom face of the top transverse wall 34 but whose length in the direction of the axis A1 is less than that of the external skirt 36. The diameters of the two flanges 42 are different and both are less than the diameter of the external skirt 36.

Inside the chamber 24 is an apertured cage 44 which delimits top and bottom parts 46 and 48 of the chamber 24. The cage 44 has an annular external radial flange 50 which bears on the bottom transverse wall 22. Relative to the flange 50, the cage 44 has a bell-shaped part extending upward from the inside radial edge of the annular flange 50. The top face of the bell-shaped part forms a bearing surface 52 against which is pressed the bottom end of a compression coil spring 54 whose top end cooperates with the bottom face of the transverse wall 34 of the float 32.

The spring 54 is set so that the force it applies to the float 32 is less than the weight of the float 32 so that, in a rest state, the float occupies its open position, as shown in FIG. 1, when the vehicle is stopped in a normal position. The spring 54 is partly guided in a cylindrical housing formed in the bottom face of the transverse wall 34.

The lateral wall 20 of the casing 14 has axial ribs 23 on a cylindrical inside face 21 arranged at regular intervals in the circumferential direction. The ribs 23 assure accurate guidance of the sliding movement of the float 32, which is pressed against them by the external cylindrical surface of the skirt 36. The ribs 23 define a radial space between the float 32 and the lateral wall 20 enabling gas to flow between the bottom orifice 26 and the top orifice 30 of the chamber 24. Of course, simply by inverting the mechanical arrangements, the ribs 23 can be on the external face of the skirt 36 of the float 32.

The top face of the bottom transverse wall 22 has a central part 56 which is frustoconical, with the larger end at the top, arid has an axis A1 and a half-angle at the apex less than 90°. The frustoconical central part 56 of the top face of the transverse wall 22 has substantially the same diameter as the bell-shaped part of the cage 44 and the orifice 26 opens onto the center of the frustoconical. part 56.

A ball 58 whose diameter is at least three times greater than that of the bottom orifice 26, for example, is received in the bottom part 48 of the chamber 24, between the frustoconical part 56 of the bottom transverse wall 22 and the bell-shaped part of the cage 44. When the vehicle is in a normal position, the ball 58 is in contact with the frustoconical surface 56 because of its weight. When the vehicle is at rest the ball 58 closes the bottom orifice 26.

According to the teachings of the invention, the system 10 includes means for slowing down the fuel before it enters the chamber 24.

To this end, the system includes a distributor plate 66 and a diffuser 68 in the casing 14, under the bottom transverse wall 22 of the chamber and the bottom orifice 26.

The distributor plate 66 and the diffuser 68 both take the form of a plate arranged transversely to the axis A1 of the system 10 and held in position by the attached part 25 in which the bottom transverse wall 22 is formed. The attached part 25 includes a cylindrical skirt 70 which extends axially downward from an outside peripheral edge of the wall 22 and delimits a housing 72, open at the bottom, in which the distributor plate 66 and the diffuser 68 are received.

As can be seen in the figures, the diffuser 68 bears axially upward against abutments 74 which are molded in one piece with the attached part 25 and which prevent the diffuser 68 coming into contact with the wall 22 at the level of the bottom orifice 26.

The distributor plate 66, which is under the diffuser 68, has a peripheral flange 76 which extends axially upward and bears in the axially upward direction !D against the peripheral edge of the member 68. The plate 66 is retained in the axially downward direction by the bottom edge 78 of the skirt 70 of the attached part 25, which is deformed radially inward, for example by heating and crimping it.

In the embodiment shown in the figures, the distributor plate 66 takes the form of an apertured plastics material plate which has a series of bores 80 at its periphery which are circumferentially distributed about the axis A1. This arrangement is particularly advantageous because the bores 80 then do not face the bottom orifice 26. However, the distributor plate 66 could also take the form of a grid, for example.

The diffuser 68 is made from a porous material, for example a material having a three-dimensional meshed open cell structure. It therefore behaves as a filter member.

The plate 66 and the diffuser 68 therefore impede the flow of fuel from the tank toward the valve chamber 24. A chicane system can be used to achieve the same effect.

As an alternative to this, a structure could advantageously be used through which the flow of fuel is slowed more in the direction from the tank toward the chamber 24 than in the direction from the chamber toward the tank. Accordingly, the distributor plate 66 could include, for some of its bores 80, non-return systems consisting of articulated flaps or a flexible member adapted to be closed if fuel flows from the tank toward the chamber 24. By limiting in this way the number of bores that are open, the flowrate through the plate 66 is limited in one direction of fuel flow.

How the system according to the invention works will now be described in more detail.

When the vehicle is stopped on a substantially horizontal surface, the ball 58 closes the orifice 26 so that there is no communication between the inside of the tank and the venting circuit to which the pipe 28 is connected.

When the ball 58 closes the bottom orifice 26 in this way, it also contributes to prohibiting overfilling of the tank.

The tank is generally filled using a nozzle which is inserted into the upper end of a filler tube (not shown) whose bottom end discharges into the tank.

As the tank is filled with liquid fuel, the vapor initially contained in the tank must be vented. A vent pipe (not shown) is usually provided for this purpose, whose bottom end discharges into the top of the Lank, through its top wall 12, and whose top end generally opens into the top part of the filler tube. More particularly, the bottom end of the vent pipe opens into the tank at a level which is vertically below the level of the bottom orifice 26 of the system 10. In this way, if the level of fuel in the tank reaches the lower end of the evacuation pipe, vapor can no longer escape via that pipe. Because the ball 58 closes the orifice 26, the vapor cannot escape through the venting system 10 either. The vapor contained in the tank can therefore continue to escape only directly via the filler tube, which causes bubbling of the fuel, forcing the user to stop dispensing fuel via the nozzle.

Figure 2:
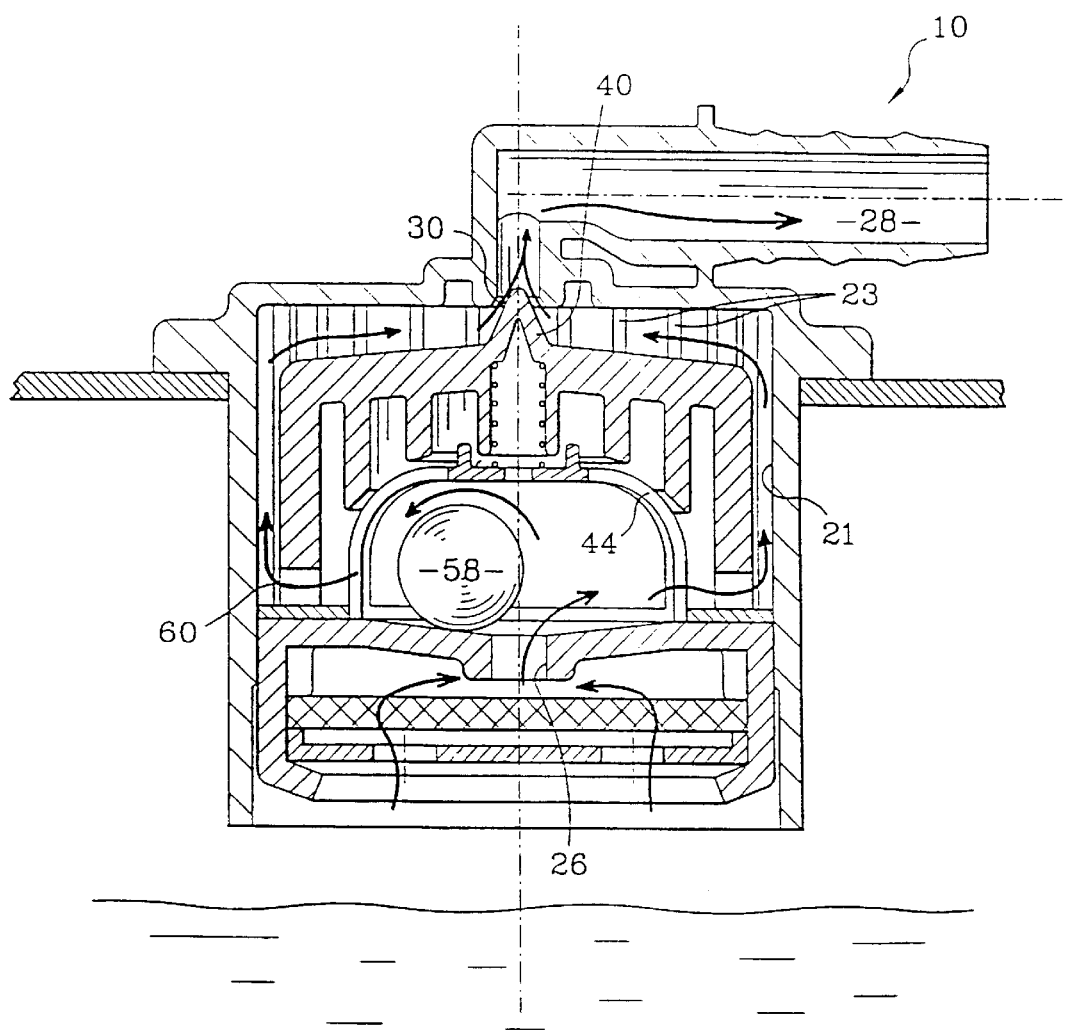
FIG. 2 is a view of the system from FIG. 1 when the vehicle is moving.

If a positive pressure occurs inside the tank, as shown in FIG. 2, for example due to heating of the gas contained therein, the positive pressure inside the tank can raise the ball 28, when then rolls on the frustoconical top surface of the bottom transverse wall 22.

A situation of this kind can also occur when the vehicle is moving, merely because of the vibration inevitably transmitted to the tank and to the system 10. In both cases the bottom edge of the external skirt 36 of the float 32 continues to bear on the flange 50 of the cage 44, which in turn bears on the bottom transverse wall 22.

However, the bottom end of the skirt 36 includes cut-outs 60 so that gas can flow freely through the system 10 between the inside of the tank and the venting pipe 28. Thus the gases flow in succession through the bottom orifice 26, the apertured cage 44, the cut-outs 60, between the outside skirt 36 of the float 32 and the lateral wall 20 of the casing 14, and, finally, through the top orifice 30 toward the pipe 28.

Accordingly, if the ball 58 has been lifted off its seat by a positive pressure inside the tank when the vehicle is stopped, the excess gas can be evacuated toward the venting circuit.

If the ball 28 has been lifted off its seat because of vibration occurring when the vehicle is moving, the venting of the tank maintains a substantially constant pressure equal to atmospheric pressure inside the tank, despite the possibility of the temperature of the gases varying and despite the fact that the level of fuel in the tank decreases as the vehicle moves around, so increasing the space given over to the gas.

FIG. 3 shows the situation in which the fuel level inside the tank, in the vicinity of the venting system 10, becomes greater than the level of the bottom transverse wall 22 of the casing 14. A situation of this kind can arise, for example, if the vehicle is standing on a steeply sloping surface or is undergoing high acceleration or deceleration.

It can be seen that the ball 58 is then expelled from its rest position, in which it closes the bottom orifice 26, and so fuel can enter the chamber 24. Because the cage 44 is apertured, the fuel can even enter the top part of the chamber 24. However, as soon as the fuel level rises above the cut-outs 60 in the external skirt 36 of the float 32, the fuel traps inside the float 32 a volume of gas which is contained between the surface of the fuel, the skirt 36 and the top transverse wall 34. The float 32 is therefore pushed upward and the needle valve 40 closes the orifice 30, preventing fuel escaping through the orifice 30 toward the vent pipe 28.

By compartmentalizing the volume of air trapped within the float 32, the annular flanges 22 reduce the time required for the float 32 to reach its closed position.

In accordance with the teachings of the invention, the fuel level in the chamber 24 cannot rise suddenly by virtue only of splashing due to sloshing of the fuel in the tank. The distributor plate 66 and the diffuser 68 slow the fuel before it enters the chamber 24, which prevents unwanted closure of the valve.

Figure 4:
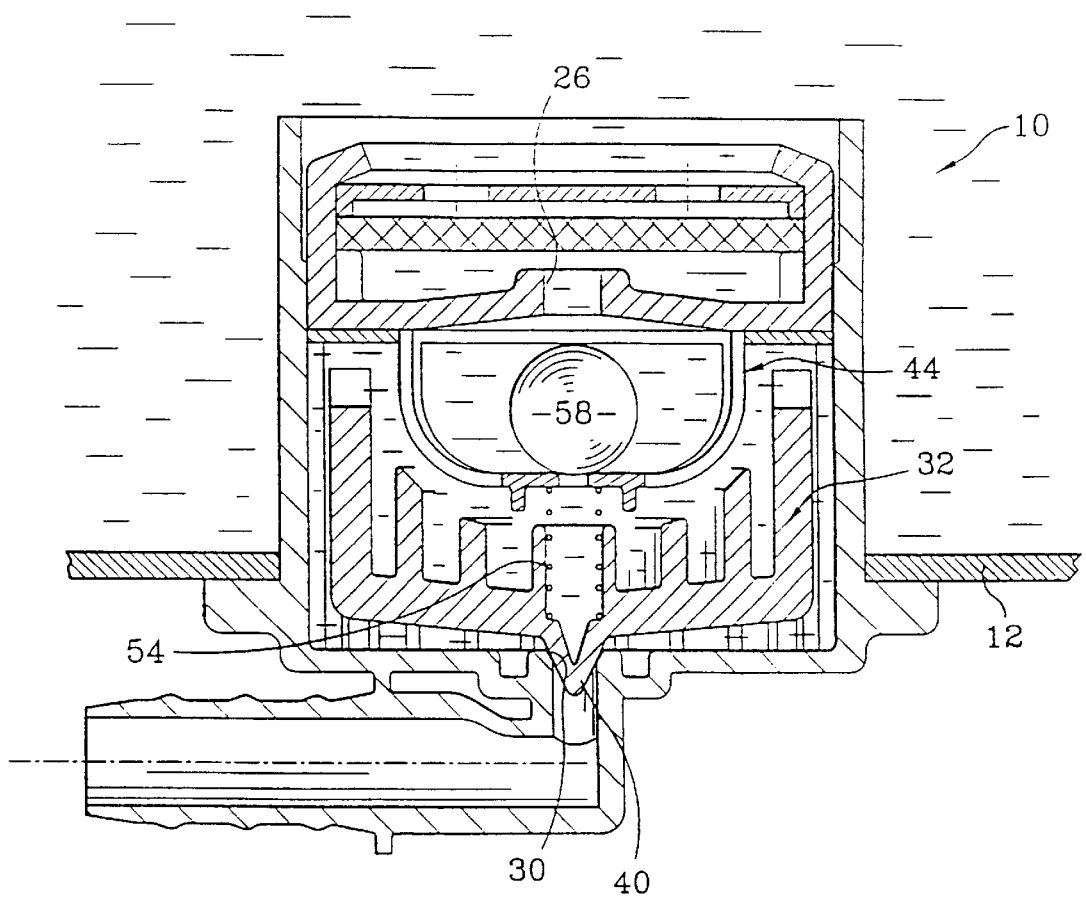
FIG. 4 is a view similar to that of FIG. 1 showing the system in the event of overturning of the vehicle.

FIG. 4 shows the system when the vehicle has overturned. Due to its weight alone, the float 32 moves toward its closed position to prevent the fuel spilling out of the tank. The spring 54 achieves this even if the vehicle is not completely overturned, for example if it is lying on its side.

Note also that the ball 58 is then retained by the cage 44 and is therefore never in contact with the float 32.

In a variant (not shown), the venting system 10 can include an integral safety valve which adjusts the pressure inside the tank if the pipe 28 or the venting circuit is blocked.

What is claimed is:

1. A venting system for an automobile vehicle fuel tank, comprising:
    a chamber which communicates with the tank and, via an outlet orifice, with a vent pipe;
    a float inside the chamber;
    a needle valve controlled by the float for closing the outlet orifice if a fuel level in the chamber exceeds a predetermined threshold; and
    a flow restricting assembly positioned between the tank and the float, and under the float, for restricting a flow of fuel coming from the tank into the chamber to contact the float, the flow restricting assembly including a plurality of orifices offset in a direction of the fuel flow and adapted to form chicanes;
    wherein the flow restricting assembly includes at least one filter element fixed stationary with respect to the chamber.

2. The venting system according to claim 1, wherein the flow restricting assembly include two superposed apertured plates provided with the offset orifices forming the chicanes.

3. The system of claim 2, wherein the filter element is disposed between the apertured plates.

4. The system of claim 3, wherein one of the apertured plates is a bottom transverse wall defining a bottom of the chamber, the bottom transverse wall has a bottom orifice functioning as one of the offset orifices and communicating with the tank.

5. The system of claim 4, wherein the other of the apertured plates is a distributor plate having a plurality of bores functioning as the remaining offset orifices, the bores are not aligned with the bottom orifice of the bottom transverse wall, the distributor plate and the bottom transverse wall are positioned below and above the filter element, respectively.

6. The system of claim 5, wherein the distributor plate has a flange member extending upwardly and bearing against the filter element, thereby preventing the filter element from coming into contact with the bores.

7. The system of claim 6, wherein the filter element bears against an abutment member extending downwardly from the bottom transverse wall, thereby preventing the filter element from coming into contact with the bottom orifice.

8. The system of claim 7, further comprising a retaining part formed contiguous to and extending downwardly from the bottom transverse wall, the retaining part and the bottom transverse wall together define a housing encompassing the distributor plate and the filter element.

9. The system of claim 8, wherein the retaining part includes a cylindrical skirt extending axially downward from a peripheral edge of the bottom transverse wall, the distributor plate and the filter element are retained in the housing by a crimped bottom edge of the skirt which is deformed transversely inwardly.

10. The venting system according to claim 1, wherein the chamber, the float and the flow restricting assembly are on a common central axis of symmetry.

11. The venting system according to claim 1, wherein the chamber is delimited at the bottom by a bottom transverse wall which has a bottom orifice communicating with the tank, and the flow restricting assembly is positioned under the bottom transverse wall and between the bottom transverse wall and the tank.

12. The venting system according to claim 11, further comprising a part formed contiguous to the bottom transverse wall, attached to a casing of the system, and including fixing elements for fixing the flow restricting assembly.

13. The venting system according to claim 12, wherein the part further includes a cylindrical skirt which extends axially downward from a peripheral edge of the bottom transverse wall and delimits a housing open at the bottom receiving therein the flow restricting assembly.

14. The venting system according to claim 13, wherein the flow restricting assembly is retained in the housing by a crimped bottom edge of the skirt which is deformed transversely inwardly.

15. A venting system for an automobile vehicle fuel tank, comprising:
    a chamber which communicates with the tank and, via an outlet orifice, with a vent pipe;

a float inside the chamber;

a needle valve controlled by the float for closing the outlet orifice if a fuel level in the chamber exceeds a predetermined threshold; and a flow restricting assembly positioned between the tank and the float, and under the float, for restricting a flow of fuel coming from the tank into the chamber to contact the float, the flow restricting assembly including a plurality of orifices offset in a direction of the fuel flow and adapted to form chicanes;

wherein the chamber is delimited at the bottom by a bottom transverse wall which has a bottom orifice communicating with the tank, and the flow restricting assembly is positioned under the bottom transverse wall and between the bottom transverse wall and the tank; and the bottom transverse wall has a top face of which at least a central part around the bottom orifice is concave and which supports a ball for closing the orifice.

16. A venting system for selectively communicating a fuel tank of an automobile vehicle with a vent pipe, said venting system comprising:

a housing mounted to the top of the fuel tank, said housing defining therein a float chamber having an outlet communicated with the vent pipe and an inlet communicated with the fuel tank;

float loosely retained inside the float chamber;

a valve controlled by the float for closing the outlet if a fuel level in the float chamber exceeds a predetermined threshold; and a flow restricting assembly positioned between the tank and the inlet of the float chamber so that fuel flowing into the float chamber from the tank cannot by pass the flow restricting assembly, thereby limiting speeds of all possible fuel flows coming from the tank into the float chamber;

wherein the float comprises a tubular body which is open at the bottom and closed at the top by a top wall, the tubular body further comprises an outer skirt extending downward from a peripheral portion thereof, the valve is formed on top of the top wall;

the float further comprises at least one tubular flange extending downward from a central portion of the top wall for a length less than that of the outer skirt; and the at least one tubular flange comprises a plurality of flanges having lengths decreasing radially inwardly with respect to the outer skirt.

17. A venting system for selectively communicating a fuel tank of an automobile vehicle with a vent pipe, said venting system comprising:

a housing mounted to the top of the fuel tank, said housing defining therein a float chamber having an outlet communicated with the vent pipe and an inlet communicated with the fuel tank;

a float loosely retained inside the float chamber;

a valve controlled by the float for closing the outlet if a fuel level in the float chamber exceeds a predetermined threshold; and a flow restricting assembly positioned between the tank and the inlet of the float chamber so that fuel flowing into the float chamber from the tank cannot by pass the flow restricting assembly, thereby limiting speeds of all possible fuel flows coming from the tank into the float chamber;

wherein the float comprises a tubular body which is open at the bottom and closed at the top by a top wall, the tubular body further comprises an outer skirt extending downward from a peripheral portion thereof, the valve is formed on top of the top wall; and the float further comprises a cutout on the outer skirt, the cutout communicates an inside of the tubular body with an outside thereof.

18. A venting system for selectively communicating a fuel tank of an automobile vehicle with a vent pipe, said venting system comprising:

a housing mounted to the top of the fuel tank, said housing defining therein a float chamber having an outlet communicated with the vent pipe and an inlet communicated with the fuel tank;

a float loosely retained inside the float chamber;

a valve controlled by the float for closing the outlet if a fuel level in the float chamber exceeds a predetermined threshold;

a flow restricting assembly positioned between the tank and the inlet of the float chamber so that fuel flowing into the float chamber from the tank cannot by pass the flow restricting assembly, thereby limiting speeds of all possible fuel flows coming from the tank into the float chamber;

an aperture cage fixed inside the float chamber beneath the float; and a biasing element formed between the aperture cage and the float, a biasing force applied on the float by the biasing element is less than the weight of the float.

19. A venting system for selectively communicating a fuel tank of an automobile vehicle with a vent pipe, said venting system comprising:

a housing mounted to the top of the fuel tank, said housing defining therein a float chamber having an outlet communicated with the vent pipe and an inlet communicated with the fuel tank;

a float loosely retained inside the float chamber;

an aperture cage fixed inside the float chamber beneath the float; and a ball loosely retained within the apertured cage for selectively closing the inlet of the float chamber.

a valve controlled by the float for closing the outlet if a fuel level in the float chamber exceeds a predetermined threshold;

a flow restricting assembly positioned between the tank and the inlet of the float chamber so that fuel flowing into the float chamber from the tank cannot by pass the flow restricting assembly, thereby limiting speeds of all possible fuel flows coming from the tank into the float chamber.

20. The system of claim 19, wherein a diameter of the ball is at least three times greater than an aperture of the inlet.

* * * * *